United States Patent [19]
Yamagishi

[11] Patent Number: 5,761,403
[45] Date of Patent: Jun. 2, 1998

[54] FAILURE RECOVERY SYSTEM AND FAILURE RECOVERY METHOD IN LOOSELY COUPLED MULTI-COMPUTER SYSTEM, AND MEDIUM FOR STORING FAILURE RECOVERY PROGRAM

[75] Inventor: Hiroharu Yamagishi, Tokyo, Japan

[73] Assignee: NEC Corporation, Tokyo, Japan

[21] Appl. No.: 649,482

[22] Filed: May 17, 1996

[30] Foreign Application Priority Data

May 17, 1995 [JP] Japan ................... 7-118084

[51] Int. Cl.$^6$ ................................................. G06F 11/00
[52] U.S. Cl. .................. 395/182.11; 395/182.13; 395/681; 707/202; 707/204; 364/268; 364/282.4; 364/269.3
[58] Field of Search ................. 395/182.11, 182.13, 395/182.14, 182.18, 181, 681, 800.01; 364/285, 282.4, 268.9, 269.3; 707/202, 204

[56] References Cited

U.S. PATENT DOCUMENTS

| | | | |
|---|---|---|---|
| 4,709,325 | 11/1987 | Yajima .................... | 364/200 |
| 4,849,978 | 7/1989 | Dishon et al. ............ | 371/51 |
| 5,029,169 | 7/1991 | Smyk ....................... | 371/19 |
| 5,134,712 | 7/1992 | Yamamoto ............... | 395/800 |
| 5,197,148 | 3/1993 | Blount et al. ............ | 395/575 |
| 5,222,217 | 6/1993 | Blount et al. ............ | 395/325 |
| 5,255,387 | 10/1993 | Arnold et al. ........... | 395/600 |
| 5,423,044 | 6/1995 | Sutton et al. ............ | 395/725 |
| 5,566,297 | 10/1996 | Devarakonda et al. .. | 395/182.13 |

OTHER PUBLICATIONS

"IMS/VS Extended Recovery Facility (XRF): General Information", GG24-3150-0, IBM World Trade Corporation, Mar., 1987, pp. i-29.

*Primary Examiner*—Robert W. Beausoliel, Jr.
*Assistant Examiner*—Dieu-Minh Lee
*Attorney, Agent, or Firm*—Young & Thompson

[57] ABSTRACT

In a loosely coupled multi-computer system, even when a failure happens to occur in any one of the loosely coupled computers, users can continue their works without having adverse influences caused by this failure. When a process operation for transaction used to update the shared data is commenced, a first computer registers such a message that it is using this shared data into an exclusive access device. After updating process information corresponding to the shared data before being updated has been outputted to the updated record holder, the first computer updates this shared data, and deletes the updating process information of the updated record holder when the transaction is ended. Either a second computer or a third computer, which is notified by the failure notifier that a failure has occurred in the first computer before the transaction is ended, registers such a message that the recovering computer uses this shared data into the exclusive access device. Then, the second or third computer returns the updating process information about "no recovery is required" to its original updating process information, among the updating process information stored in the updated record holder, thereby recovering this shared data. As a consequence, this updating process information is brought into such updating process information about "no recovery is required".

19 Claims, 6 Drawing Sheets

FAILURE RECOVERY SYSTEM AND FAILURE RECOVERY METHOD IN LOOSELY COUPLED MULTI-COMPUTER SYSTEM, AND MEDIUM FOR STORING FAILURE RECOVERY PROGRAM

BACKGROUND OF THE INVENTION

1. Field of the Invention

The present invention relates a failure recovery system and a failure recovery method in a loosely coupled multi-computer system, and also to a medium for storing a failure recovery program.

2. Description of the Related Art

One highly reliable computer system, i.e., the hot standby system utilizing the loosely coupled multi-computer system is described in "IMS/VS EXTENDED RECOVERY FACILITY (XRF)" GENERAL INFORMATION GG24-3150-00, IBM World Trade Corporation, March 1987. In this highly reliable computer system, even when the failure happens to occur in the computer, the users can continue to perform work without having an adverse influence caused by this failure.

This hot standby system is constructed of two computer systems, i.e., the active system computer for executing the work process (referred to as an "active-system" hereinafter), and the alternate system computer for executing the recovery process when the failure occurs in the active system (referred to as an "alternate system" hereinafter). In such a case that a failure occurs while the active system updates the data shared among the respective computers, after the state of the data partly updated by the active system is recovered to the state thereof before the updating operation by the alternate system, this alternate system is newly changed into the active system to thereby continuously execute the work.

In this conventional hot standby system, such a preparation process is required. That is, the information required to recover the state of the data partly updated by the computer where the failure happens to occur to the state thereof before the updating process is previously transferred to other computer which will execute the recovery process.

However, in this conventional hot standby system, when this preparation process could not be performed for some reason, the following problem will occur. That is, even when a failure happens to occur in the active system under above conditions, since the alternate system could not acquire the information required to recover the data updated by the active system, this alternate system could not execute the recovery process.

There is another problem that since the active system and the alternate system are arranged in one-to-one correspondence, no recovery process can be performed when the computer in the alternate system is interrupted in order to execute the maintenance work.

SUMMARY AND OBJECTS OF THE INVENTION

An object of the present invention is to provide a highly reliable computer system capable of continuously executing without having an adverse influence caused by a failure even when this failure occurs in any of a group of computers constituting a loosely coupled multi-computer system.

Another object of the present invention is to realize such a computer system that even when the failure occurs in any of these computers constituting the loosely coupled multi-computer system, if there are other computers operated under normal conditions, then the state of the data updated by the first-mentioned computer where the failure occurs can be recovered to the state thereof before the updating process by any of these computers operated under normal conditions.

A further object of the present invention is to realize such a computer system that even when such a computer for recovering a state of data updated by another computer in which a failure occurs to a state thereof before the updating operation does not receive information required to execute the recovery process before this failure occurs, the first-mentioned computer can execute the recovery process.

A failure recovery system in a first loosely coupled multi-computer system of the present invention is comprised of:

a plurality of computers;

shared data shared between said plurality of computers;

updated record holding means for holding a state of said shared data before being updated as updating process information with respect to each of said plural computers; and failure notifying means for notifying such a fact that a failure occurs in any of said plural computers to other computers where no failure occurs; wherein:

each of said plural computers stores said state of the shared data before being updated as said updating process information into said updated record holding means during work execution, and thereafter updates said shared data, and then deletes said updating process information when the work execution is accomplished.

A failure recovery system in a second loosely coupled multi-computer system of the present invention as recited in the first loosely coupled multi-computer system is characterized in that:

when each of said plural computers receives notification for notifying that a failure occurs in other computers from said failure notifying means, each of said computers further recovers the state of said shared data to the state thereof before the updating operation based upon said updating process information stored in said updated record holding means of said other computers.

A failure recovery system in a third loosely coupled multi-computer system of the present invention, is comprised of:

a plurality of computers;

shared data shared between said plurality of computers;

updated record holding means for holding a state of said shared data before being updated as updating process information with respect to each of said plural computers;

exclusive means for registering therein an identifier of the computer for executing the updating process to said shared data; and failure notifying means for notifying such a fact that a failure occurs in any of said plural computers to other computers where no failure occurs; is characterized:

only when identifiers of said other computers are not registered into said exclusive means, each of said plural computers registers the identifier of the own computer into said exclusive means, stores the state of said shared data before the updating operation as said updating process information into said updated record holding means, and thereafter updates said shared data during work execution; and each of said plural computers deletes said updating process information and deletes the identifier of the own computer from said exclusive means when the work execution is accomplished.

A failure recovery system in a fourth loosely coupled multi-computer system of the present invention as recited in the third loosely coupled multi-computer system characterized in that:

when each of said plural computers receives notification for notifying that a failure happens to occur in other computers from said failure notifying means, each of said plural computers further deletes identifiers of said other computers registered into said exclusive means; registers an identifier of own computer into said exclusive means; returns said updating process information stored in said updated record holding means of said other computers to original updating process information thereof in order to recover the state of said shared data to the state thereof before the updating process; and deletes the identifier of the own computer registered into said exclusive means.

A failure recovery system in a fifth loosely coupled multi-computer system of the present invention, is comprised of:

a plurality of computers;

shared data shared between said plurality of computers;

updated record holding means for holding a state of said shared data before being updated as updating process information with respect to each of said plural computers;

exclusive means for registering therein an identifier of the computer for executing the updating process to said shared data;

recovery information containing the identifier of said computer and such information for indicating whether or not the recovery process of said computer is carried out with respect to each of said plural computers; and failure notifying means for notifying such a fact that a failure happens to occur in any of said plural computers to other computers where no failure occurs; wherein:

only when identifiers of said other computers are not registered into said exclusive means, each of said plural computers registers the identifier of the own computer into said exclusive means, stores the state of said shared data before the updating operation as said updating process information into said updated record holding means, and thereafter updates said shared data during work execution; and each of said plural computers attaches such an identifier about "no recovery is required" to said updating process information, and deletes the identifier of the own computer from said exclusive means when the work execution is ended.

A failure recovery system in a sixth loosely coupled multi-computer system of the present invention as recited in the fifth loosely coupled multi-computer system is characterized in that:

when each of said plural computers receives notification for notifying that a failure occurs in other computers from said failure notifying means, each of said computers further judges whether or not the recovery process is executed with reference to said recovery information of said other computer; and when it is judged that the recovery process is not carried out, each of said plural computers deletes the identifiers of said other computers registered in said exclusive means to thereby register the identifier of the own computer therein; registers therein such a message that the recovery process is performed to said recovery information of said other computers; returns such updating process information to which the identifier about "no recovery is required" is attached into the original updating process information thereof among said updating process information stored in said updated record holding means of said other computers so as to thereby recover the state of said shared data into the state thereof before the updating process; attaches the identifier about "no recovery is required" to said updating process information; deletes the identifier of the own computer registered in said exclusive means; and also deletes said recovery information of said other computers therefrom.

A failure recovery system in a seventh loosely coupled multi-computer system of the present invention, is comprised of:

a plurality of computers;

shared data shared between said plurality of computers;

updated record holding means for holding a state of said shared data before being updated as updating process information with respect to each of said plural computers;

updated record managing means for holding a name of an apparatus to which said updated record holding means is set with respect to each of said plural computers;

exclusive means for registering therein an identifier of the computer for executing the updating process to said shared data;

recovery information containing the identifier of said computer, the name of the apparatus to which said updated record managing means is set and held by said computer, information for indicating whether or not the recovery process of said computer is executed, and also the computer identifiers of said other computers to which the recovery process is carried out; and failure notifying means for notifying such a fact that a failure happens to occur in any of said plural computers to other computers where no failure occurs; wherein:

each of said plural computers produces said recovery information for containing therein the identifier of the own computer and the name of the apparatus to which said updated record managing means of the own computer is set when work execution is commenced;

only when identifiers of said other computers are not registered into said exclusive means, each of said plural computers registers the identifier of the own computer into said exclusive means, stores the state of said shared data before the updating operation as said updating process information into said updated record holding means, and thereafter updates said shared data during work execution; and each of said plural computers attaches such an identifier about "no recovery is required" to said updating process information, and deletes the identifier of the own computer from said exclusive means when the work execution is ended.

A failure recovery system in an eighth loosely coupled multi-computer system of the present invention as recited in the seventh loosely coupled multi-computer system is characterized in that:

when each of said plural computers receives notification for notifying that a failure occurs in other computers from said failure notifying means, each of said computers further judges whether or not the recovery process is executed with reference to said recovery information of said other computer; and when it is judged that the recovery process is not carried out, each of said plural computers deletes the identifiers of said other computers registered in said exclusive means to thereby register the identifier of the own computer therein; registers therein such a message that the recovery process is performed to said recovery information of said other computers and also the identifier of the own computer;

recognizes the name of said apparatus to which said updated record holding means is set with reference to said recovery information of said other computers; returns such updating process information to which the identifier about "no recovery is required" is attached into the original updating process information thereof among said updating process information stored in said updated record holding means of said other computers so as to thereby recover the state of said shared data into the state thereof before the updating process; attaches the identifier about "no recovery is required" to said updating process information; deletes the identifier of the own computer registered in said exclusive means; and also deletes said recovery information of said other computers therefrom.

A failure recovery system in a ninth loosely coupled multi-computer system of the present invention as recited in the eighth loosely coupled multi-computer system wherein:

when each of said plural computers receives notification for notifying that a failure occurs in other computers from said failure notifying means, each of said computers further judges whether or not there is said recovery information where said message that said other computers execute the recovery process have been registered; and when it is judged that said recovery information is present, each of said plural computers performs a process operation to update also said shared data updated by the computer corresponding to said recovery information in a similar manner to update said shared data updated by said other computers, thereby the state of said shared data is recovered to the state thereof before the updating process.

A failure recovery method in the first loosely coupled multi-computer system of the present invention, is comprised of: a plurality of computers; shared data shared between said plurality of computers; updated record holding means for holding a state of said shared data before being updated as updating process information with respect to each of said plural computers; and failure notifying means for notifying such a fact that a failure happens to occurs in any of said plural computers to other computers where no failure occurs; wherein:

said failure recovery method includes the following steps:

each of said plural computers stores said state of the shared data before being updated as said updating process information into said updated record holding means during work execution, and thereafter updates said shared data, and then deletes said updating process information when the work execution is accomplished.

A failure recovery method in the second loosely coupled multi-computer system of the present invention as recited in the first loosely coupled multi-computer system is characterized in that:

said failure recovery method includes the following steps:

when each of said plural computers receives a notification that a failure happens to occur in other computers from said failure notifying means, each of said computers further recovers the state of said shared data to the state thereof before the updating operation based upon said updating process information stored in said updated record holding means of said other computers.

A failure recovery method in the third loosely coupled multi-computer system of the present invention, is comprised of: a plurality of computers; shared data shared between said plurality of computers; updated record holding means for holding a state of said shared data before being updated as updating process information with respect to each of said plural computers; and failure notifying means for notifying such a fact that a failure happens to occur in any of said plural computers to other computers where no failure occurs; wherein:

said failure recovery method includes the following steps:

only when identifiers of said other computers are not registered into said exclusive means, each of said plural computers registers the identifier of the own computer into said exclusive means, stores the state of said shared data before the updating operation as said updating process information into said updated record holding means, and thereafter updates said shared data during work execution; and each of said plural computers deletes said updating process information and deletes the identifier of the own computer from said exclusive means when the work execution is accomplished.

A failure recovery method in the fourth loosely coupled multi-computer system of the present invention as recited in the third loosely coupled multi-computer system is characterized in that:

said failure recovery method includes the following steps:

when each of said plural computers receives notification for notifying that a failure happens to occur in other computers from said failure notifying means, each of said plural computers further deletes identifiers of said other computers registered into said exclusive means; registers an identifier of own computer into said exclusive means; returns said updating process information stored in said updated record holding means of said other computers to original updating process information thereof in order to recover the state of said shared data to the state thereof before the updating process; and deletes the identifier of the own computer registered into said exclusive means.

A failure recovery method in the fifth loosely coupled multi-computer system of the present invention, is comprised of: a plurality of computers; shared data shared between said plurality of computers; updated record holding means for holding a state of said shared data before being updated as updating process information with respect to each of said plural computers; exclusive means for registering therein an identifier of the computer for executing the updating process to said shared data; recovery information containing the identifier of said computer and such information for indicating whether or not the recovery process of said computer is carried out with respect to each of said plural computers; and, failure notifying means for notifying such a fact that a failure happens to occur in any of said plural computers to other computers where no failure occurs; wherein:

said failure recovery method includes the steps:

only when identifiers of said other computers are not registered into said exclusive means, each of said plural computers registers the identifier of the own computer into said exclusive means. stores the state of said shared data before the updating operation as said updating process information into said updated record holding means, and thereafter updates said shared data during work execution; and each of said plural computers attaches such an identifier about "no recovery is required" to said updating process information, and deletes the identifier of the own computer from said exclusive means when the work execution is ended.

A failure recovery method in the sixth loosely coupled multi-computer system of the present invention as recited in the fifth loosely coupled multi-computer system is characterized in that:

said failure recovery method includes the steps of:

when each of said plural computers receives notification for notifying that a failure happens to occur in other computers from said failure notifying means, each of said computers further judges whether or not the recovery process is executed with reference to said recovery information of said other computer; and when it is judged that the recovery process is not carried out, each of said plural computers deletes the identifiers of said other computers registered in said exclusive means to thereby register the identifier of the own computer therein; registers therein such a message that the recovery process is performed to said recovery information of said other computers; returns such updating process information to which the identifier about "no recovery is required" is attached into the original updating process information thereof among said updating process information stored in said updated record holding means of said other computers so as to thereby recover the state of said shared data into the state thereof before the updating process; attaches the identifier about "no recovery is required" to said updating process information; deletes the identifier of the own computer registered in said exclusive means; and also deletes said recovery information of said other computers therefrom.

A failure recovery method in the seventh loosely coupled multi-computer system of the present invention. is comprised of: a plurality of computers; shared data shared between said plurality of computers; updated record holding means for holding a state of said shared data before being updated as updating process information with respect to each of said plural computers; updated record managing means for holding a name of an apparatus to which said updated record holding means is set with respect to each of said plural computers; exclusive means for registering therein an identifier of the computer for executing the updating process to said shared data; recovery information containing the identifier of said computer, the name of the apparatus to which said updated record managing means is set and which is held by said computer, information for indicating whether or not the recovery process of said computer is executed, and also the computer identifiers of said other computers to which the recovery process is carried out; and, failure notifying means for notifying such a fact that a failure happens to occur in any of said plural computers to other computers where no failure occurs; wherein:

said failure recovery method includes the following steps:
each of said plural computers produces said recovery information for containing therein the identifier of the own computer and the name of the apparatus to which said updated record managing means of the own computer is set when work execution is commenced;

only when identifiers of said other computers are not registered into said exclusive means, each of said plural computers registers the identifier of the own computer into said exclusive means, stores the state of said shared data before the updating operation as said updating process information into said updated record holding means, and thereafter updates said shared data during work execution; and each of said plural computers attaches such an identifier about "no recovery is required" to said updating process information, and deletes the identifier of the own computer from said exclusive means when the work execution is ended.

A failure recovery method in the eighth loosely coupled multi-computer system of the present invention as recited in the seventh loosely coupled multi-computer system is characterized in that:

said failure recovery method includes the following steps:

when each of said plural computers receives notification for notifying that a failure happens to occur in other computers from said failure notifying means, each of said computers further judges whether or not the recovery process is executed with reference to said recovery information of said other computer; and when it is judged that the recovery process is not carried out, each of said plural computers deletes the identifiers of said other computers registered in said exclusive means to thereby register the identifier of the own computer therein; registers therein a message such that the recovery process is performed to said recovery information of said other computers and also the identifier of the own computer;

recognizes the name of said apparatus to which said updated record holding means is set with reference to said recovery information of said other computers; returns such updating process information to which the identifier about "no recovery is required" is attached into the original updating process information thereof among said updating process information stored in said updated record holding means of said other computers so as to thereby recover the state of said shared data into the state thereof before the updating process; attaches the identifier about "no recovery is required" to said updating process information; deletes the identifier of the own computer registered in said exclusive means; and also deletes said recovery information of said other computers therefrom.

A failure recovery method in the ninth loosely coupled multi-computer system of the present invention as recited in the eighth loosely coupled multi-computer system is characterized in that:

said failure recovery method includes the steps:

when each of said plural computers receives notification for notifying that a failure happens to occur in other computers from said failure notifying means, each of said computers further judges whether or not there is said recovery information where said message that said other computers execute the recovery process have been registered; and when it is judged that said recovery information is present, each of said plural computers performs a process operation to update also said shared data updated by the computer corresponding to said recovery information in a similar manner to update said shared data updated by said other computers, thereby the state of said shared data is recovered to the state thereof before the updating process.

A medium for storing therein the failure recovery program in the first loosely coupled multi-computer system of the present invention is characterized by that:

in the loosely coupled multi-computer system comprising: a plurality of computers; shared data shared between said plurality of computers; updated record holding means for holding a state of said shared data before being updated as updating process information with respect to each of said plural computers; and, failure notifying means for notifying such a fact that a failure happens to occurs in any of said plural computers to other computers where no failure occurs;

said medium stores therein a program such that:

each of said plural computers stores said state of the shared data before being updated as said updating process information into said updated record holding means during work execution, and thereafter updates said shared data, and then deletes said updating process information when the work execution is accomplished.

A medium for storing therein the failure recovery program in the second loosely coupled multi-computer system of the present invention as recited in the first loosely coupled multi-computer system is characterized in that:

when each of said plural computers receives notification for notifying that a failure happens to occur in other computers from said failure notifying means, said program stored in the medium further recovers the state of said shared data to the state thereof before the updating operation based upon said updating process information stored in said updated record holding means of said other computers.

A medium for storing therein the failure recovery program in the third loosely coupled multi-computer system according to the present invention is characterized by that:

in the loosely coupled multi-computer system comprising: a plurality of computers; shared data shared between said plurality of computers; updated record holding means for holding a state of said shared data before being updated as updating process information with respect to each of said plural computers; exclusive means for registering therein an identifier of the computer for executing the updating process to said shared data; and, failure notifying means for notifying such a fact that a failure happens to occur in any of said plural computers to other computers where no failure occurs;

said medium stores therein a program such that:

only when identifiers of said other computers are not registered into said exclusive means, each of said plural computers registers the identifier of the own computer into said exclusive means, stores the state of said shared data before the updating operation as said updating process information into said updated record holding means, and thereafter updates said shared data during work execution; and each of said plural computers deletes said updating process information and deletes the identifier of the own computer from said exclusive means when the work execution is accomplished.

A medium for storing therein a failure recovery program in the fourth loosely coupled multi-computer system according to the present invention as recited in the third loosely coupled multi-computer system is characterized in that:

when each of said plural computers receives notification for notifying that a failure happens to occur in other computers from said failure notifying means, said program stored in the medium further deletes identifiers of said other computers registered into said exclusive means; registers an identifier of own computer into said exclusive means; returns said updating process information stored in said updated record holding means of said other computers to original updating process information thereof in order to recover the state of said shared data to the state thereof before the updating process; and deletes the identifier of the own computer registered into said exclusive means.

A medium for storing therein the failure recovery program in the fifth loosely coupled multi-computer system of the present invention is characterized by that:

in the loosely coupled multi-computer system comprising: a plurality of computers; shared data shared between said plurality of computers; updated record holding means for holding a state of said shared data before being updated as updating process information with respect to each of said plural computers; exclusive means for registering therein an identifier of the computer for executing the updating process to said shared data; recovery information containing the identifier of said computer and such information for indicating whether or not the recovery process of said computer is carried out with respect to each of said plural computers; and failure notifying means for notifying such a fact that a failure happens to occur in any of said plural computers to other computers where no failure occurs;

said medium stores therein a program such that:

only when identifiers of said other computers are not registered into said exclusive means, each of said plural computers registers the identifier of the own computer into said exclusive means, stores the state of said shared data before the updating operation as said updating process information into said updated record holding means, and thereafter updates said shared data during work execution; and each of said plural computers attaches such an identifier about "no recovery is required" to said updating process information, and deletes the identifier of the own computer from said exclusive means when the work execution is ended.

A medium for storing therein the failure recovery program in the sixth loosely coupled multi-computer system according to the present invention as recited in the fifth loosely coupled multi-computer system is characterized in that:

when each of said plural computers receives notification for notifying that a failure happens to occur in other computers from said failure notifying means, said program stored in the medium further judges whether or not the recovery process is executed with reference to said recovery information of said other computer; and when it is judged that the recovery process is not carried out, said program deletes the identifiers of said other computers registered in said exclusive means to thereby register the identifier of the own computer therein; registers therein such a message that the recovery process is performed to said recovery information of said other computers; returns such updating process information to which the identifier about "no recovery is required" is attached into the original updating process information thereof among said updating process information stored in said updated record holding means of said other computers so as to thereby recover the state of said shared data into the state thereof before the updating process; attaches the identifier about "no recovery is required" to said updating process information; deletes the identifier of the own computer registered in said exclusive means; and also deletes said recovery information of said other computers therefrom.

A medium for storing therein the failure recovery program in the seventh loosely coupled multi-computer system of the present invention is characterized by that: in the loosely coupled multi-computer system comprising: a plurality of computers; shared data shared between said plurality of computers; updated record holding means for holding a state of said shared data before being updated as updating process information with respect to each of said plural computers; updated record managing means for holding a name of an apparatus to which said updated record holding means is set with respect to each of said plural computers; exclusive means for registering therein an identifier of the computer for executing the updating process to said shared data; recovery information containing the identifier of said computer, the name of the apparatus to which said updated record managing means is set and which is held by said computer, information for indicating whether or not the recovery process of said computer is executed, and also the computer identifiers of said other computers to which the recovery process is carried out; and, failure notifying means for notifying such a fact that a failure happens to occur in any of said plural computers to other computers where no failure occurs;

said medium stores therein a program such that:

each of said plural computers produces said recovery information for containing therein the identifier of the own computer and the name of the apparatus to which said updated record managing means of the own computer is set when work execution is commenced;

only when identifiers of said other computers are not registered into said exclusive means, each of said plural computers registers the identifier of the own computer into said exclusive means, stores the state of said shared data before the updating operation as said updating process information into said updated record holding means, and thereafter updates said shared data during work execution; and each of said plural computers attaches such an identifier about "no recovery is required" to said updating process information, and deletes the identifier of the own computer from said exclusive means when the work execution is ended.

A medium for storing therein the failure recovery program in the eighth loosely coupled multi-computer system according to the present invention as recited in the seventh loosely coupled multi-computer system is characterized in that:

when each of said plural computers receives notification for notifying that a failure happens to occur in other computers from said failure notifying means, said program in the medium further judges whether or not the recovery process is executed with reference to said recovery information of said other computer; and when it is judged that the recovery process is not carried out, said program deletes the identifiers of said other computers registered in said exclusive means to thereby register the identifier of the own computer therein; registers therein such a message that the recovery process is performed to said recovery information of said other computers and also the identifier of the own computer;

recognizes the name of said apparatus to which said updated record holding means is set with reference to said recovery information of said other computers; returns such updating process information to which the identifier about "no recovery is required" is attached into the original updating process information thereof among said updating process information stored in said updated record holding means of said other computers so as to thereby recover the state of said shared data into the state thereof before the updating process; attaches the identifier about "no recovery is required" to said updating process information; deletes the identifier of the own computer registered in said exclusive means; and also deletes said recovery information of said other computers therefrom.

A medium for storing therein the failure recovery program in the ninth loosely coupled multi-computer system according to the present invention as recited in the eighth loosely coupled multi-computer system is characterized in that:

when each of said plural computers receives notification for notifying that a failure happens to occur in other computers from said failure notifying means, said program stored in the medium further judges whether or not there is said recovery information where said message that said other computers execute the recovery process have been registered; and when it is judged that said recovery information is present, said program performs a process operation to update also said shared data updated by the computer corresponding to said recovery information in a similar manner to update said shared data updated by said other computers, thereby the state of said shared data is recovered to the state thereof before the updating process.

BRIEF DESCRIPTION OF THE DRAWINGS

The invention will be understood more fully from the detailed description given here below and from the accompanying drawings of preferred embodiments of the invention, which, however, should not be considered as limiting the invention but are for explanation and understanding only.

Here, it should be noted that like reference numerals represent like elements throughout the disclosure.

DETAILED DESCRIPTION OF THE PREFERRED EMBODIMENT

Referring now to drawings, various embodiments of the present invention will be described more in detail.

Figure 1:
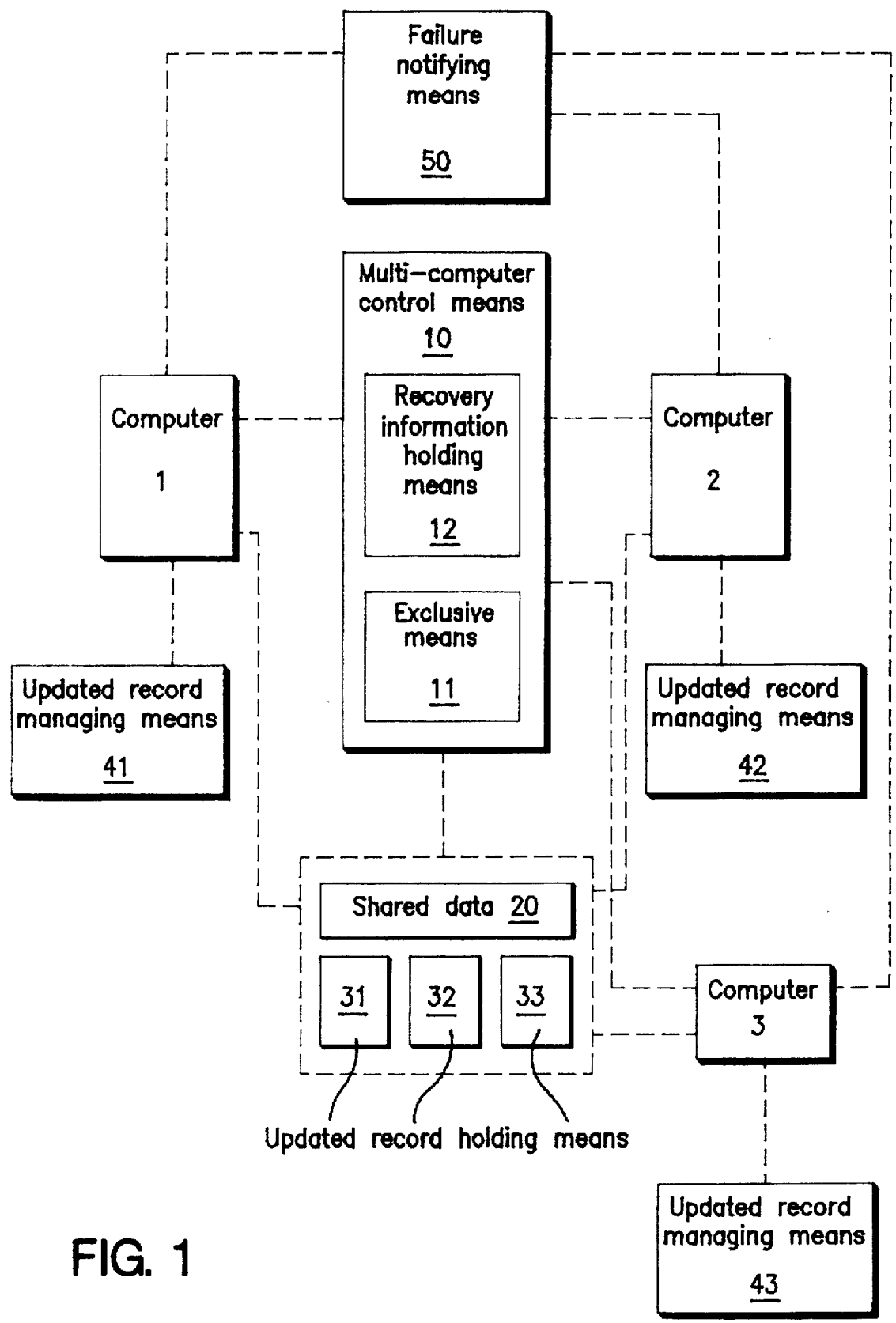
FIG. 1 is a schematic block diagram representing an arrangement of a failure recovery system in a loosely coupled multi-computer system, according to an embodiment of the present invention.

Referring to FIG. 1, a failure recovery system employed in a loosely coupled multi-computer system, according to an embodiment of the present invention, comprises a computer 1, another computer 2, another computer 3, which constitute the loosely coupled multi-computer system; shared data 20 commonly used by all the computers 1 to 3; and a multi-computer control means 10 including an exclusive means 11 for managing one computer for executing the updating process with respect to the shared data 20, and also a recovery information holding means 12 for holding recovery information required when a failure occurs in any of the computers constituting the loosely coupled multi-computer system, such that other computers operated under normal condition perform the recovery process. The failure recovery system further constitutes updated record holding means 31, 32, 33 for holding updating process information with respect to each of these computers, when the shared data 20 is updated by the execution processes by the respective computers; updated record managing means 41, 42, 43 for holding information about the updated record holding means 31, 32, and 33 hold with respect to each of the computers; and failure notifying means 50 for notifying all other computers of a failure in one computer.

It should be noted that to identify the respective computers for constituting the loosely coupled multi-computer system, a computer identifier specific to each of the computers is held. For instance, the computer 1 holds "1" as the computer identifier thereof, the computer 2 holds "2" as the computer identifier thereof, and the computer 3 holds "3" as the computer identifier thereof.

The shared data 20 is arranged on a disk apparatus to which all of the computers have access.

The updated record holding means 31, 32, 33 hold the information about the data before being updated with respect to each of the computers, and are arranged on the disk apparatuses to which all of these computers have access. This data to be updated is required to perform a roll back process. When a process in a certain logic unit (will be referred to as a "transaction" hereinafter) entered from a terminal and the like is interrupted for some reason, this roll back process may return the data which has been updated during the execution stage of this process to the data obtained before the updating operation was performed.

It should also be noted that only when such a computer for performing the recovery process accesses the updated record holding means of the computer where the failure occurs, this recovery-process-executing computer accesses the updated record holding means of the other computers. The updated record managing means 41, 42, 43 hold the information such as names of the disk apparatuses for arranging the updated record holding means 31, 32, 33 and are arranged on the disk apparatuses connected to the respective computers. In normal operation, the disk apparatus equipped with the updated record managing means 41, 42, 43 can be accessed only by the computer to which it is attached, but cannot be accessed by other computers.

Figure 2:
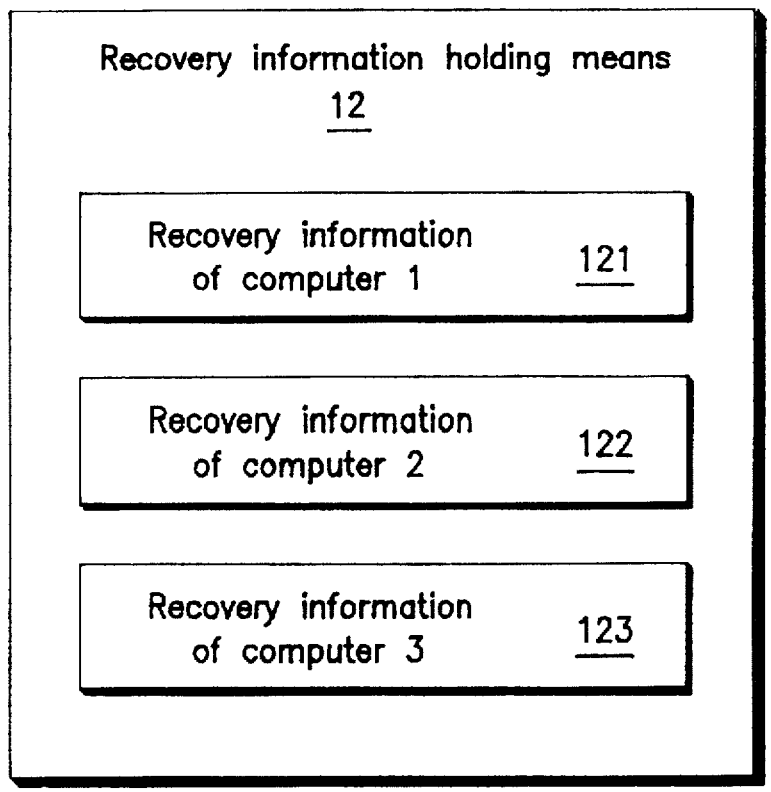
FIG. 2 is a schematic diagram showing a content of recovery information holding means 12 employed in the failure recovery system according to the embodiment of the present invention.

Referring now to FIG. 2, the recovery information holding means 12 contains recovery information 121, 122 and 123 with regard to each of the computers.

Figure 3:
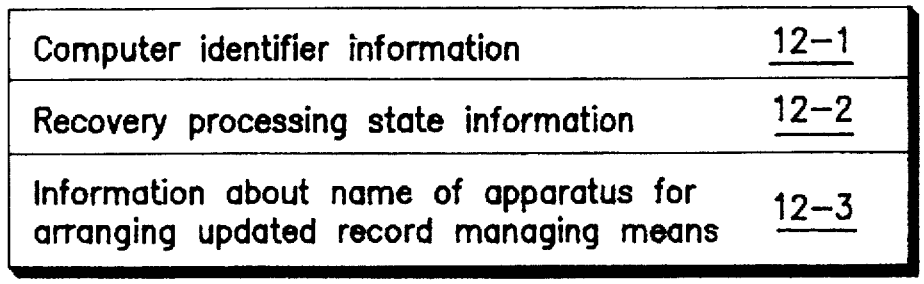
FIG. 3 is a schematic illustration of the contents of recovery information 121, 122 and 123 used in the failure recovery system according to the embodiment of the present invention.

Referring now to FIG. 3, these recovery information 121, 122 and 123 contain computer identifier information 12-1 used to set the computer identifiers of the respective computers; recovery processing state information 12-2 indicative of the recovery process state; and information about names of apparatus for arranging updated record managing means 12-3 indicative of names of apparatus in which the updated record managing means 41, 42 and 43 are arranged.

Figure 4:
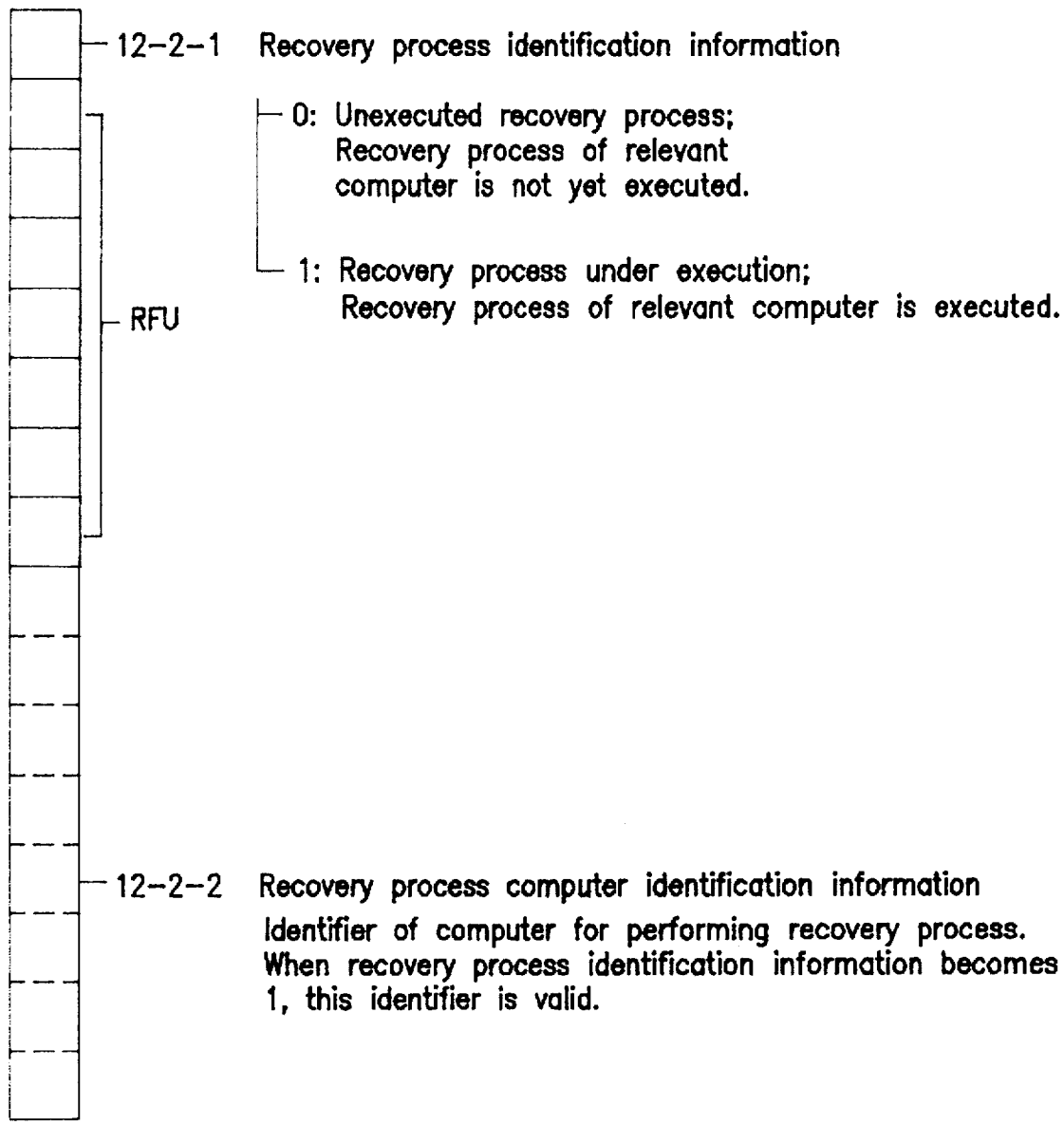
FIG. 4 is a schematic diagram indicating a content of recovery processing state information 12-2 used in the failure recovery system according to the embodiment of the present invention.
Figure 5:
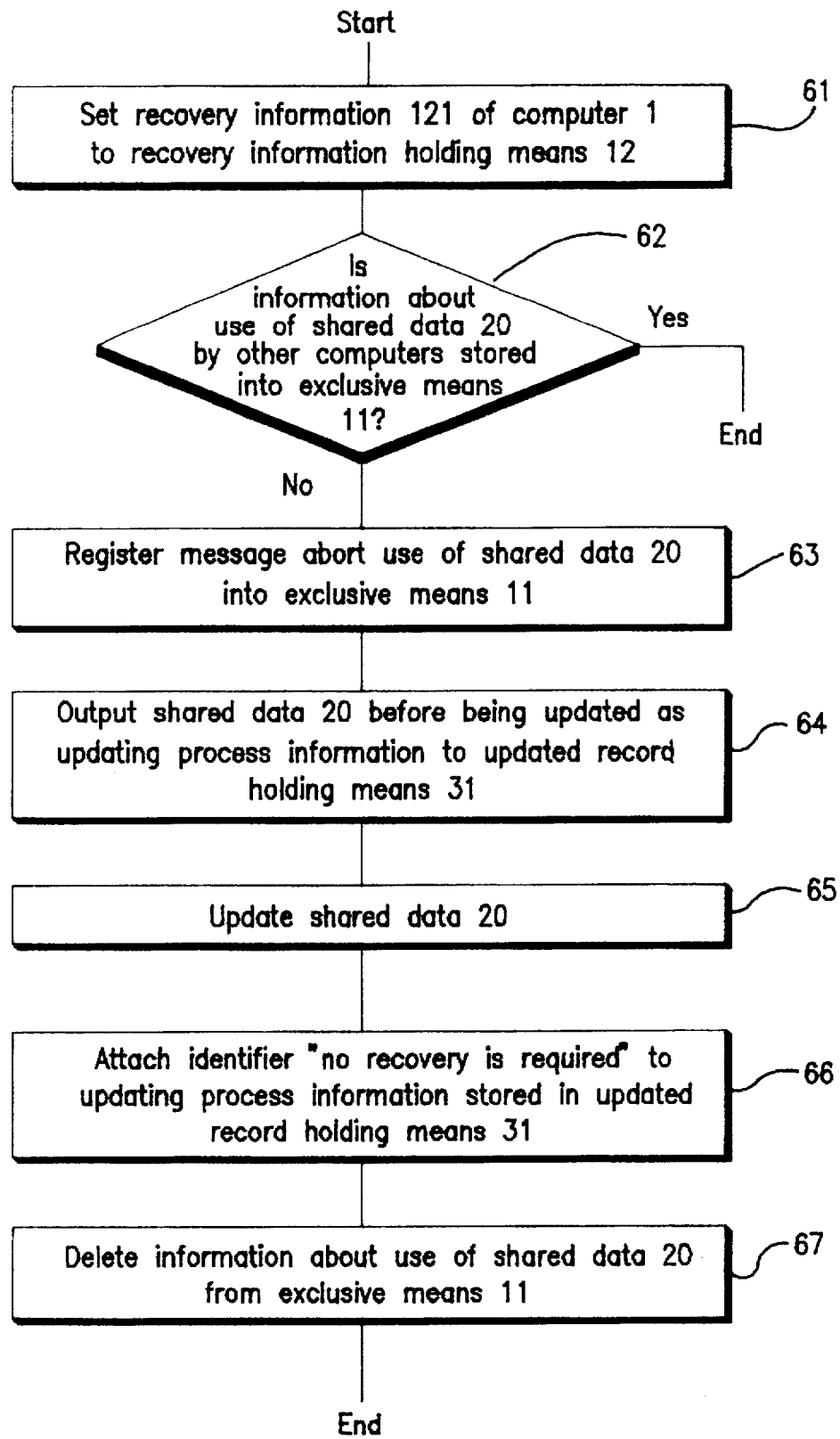
FIG. 5 is a flowchart of an updating process to shared data 20 of a computer 1 employed in the failure recovery system according to the embodiment of the present invention.
Figure 6A:
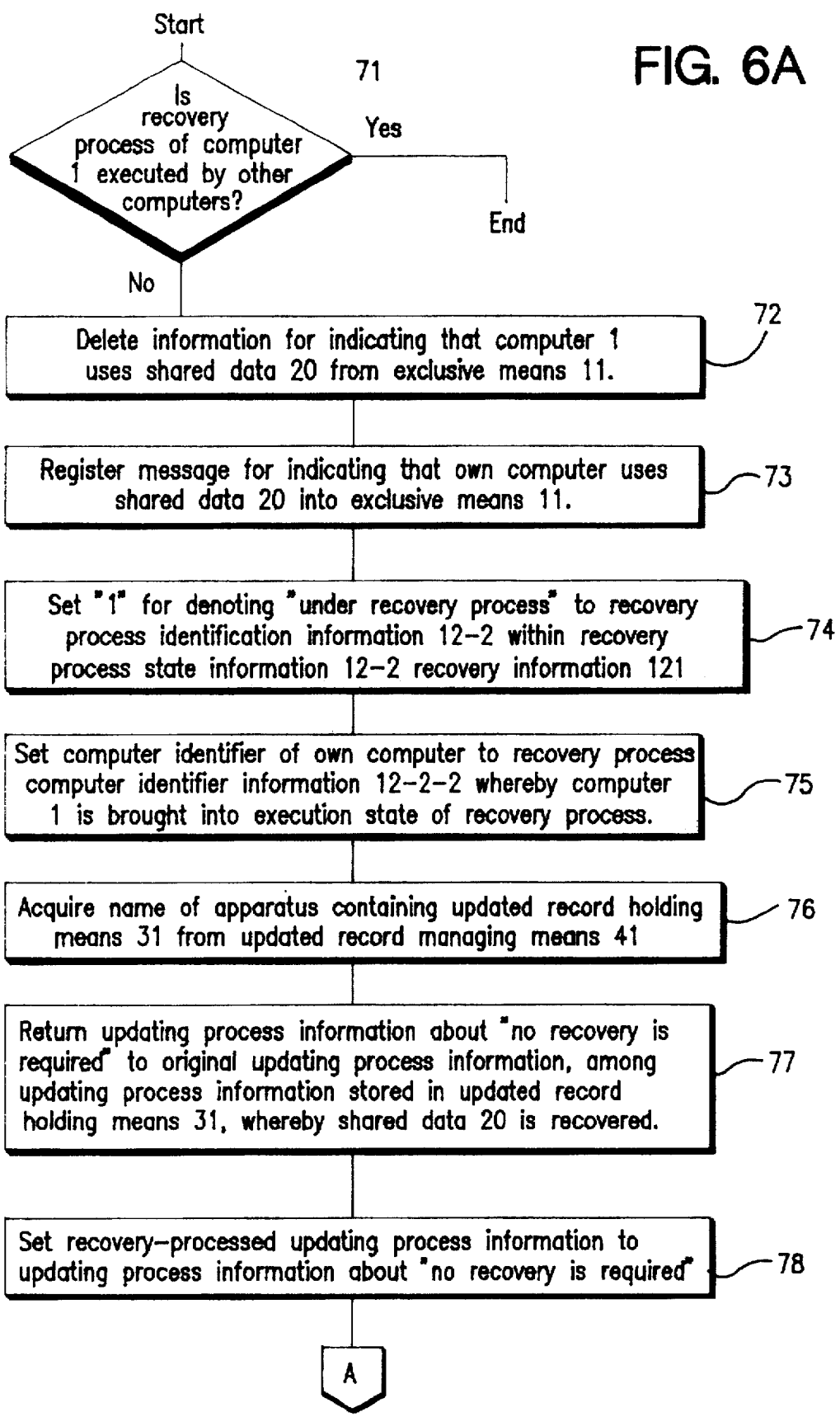
FIG. 6 is a flowchart of a process operation that a computer 2 and a computer 3 employed in the failure recovery system according to the embodiment of the present invention recover the shared data 20 updated by the computer to the state before the update operation is carried out.
Figure 6B:
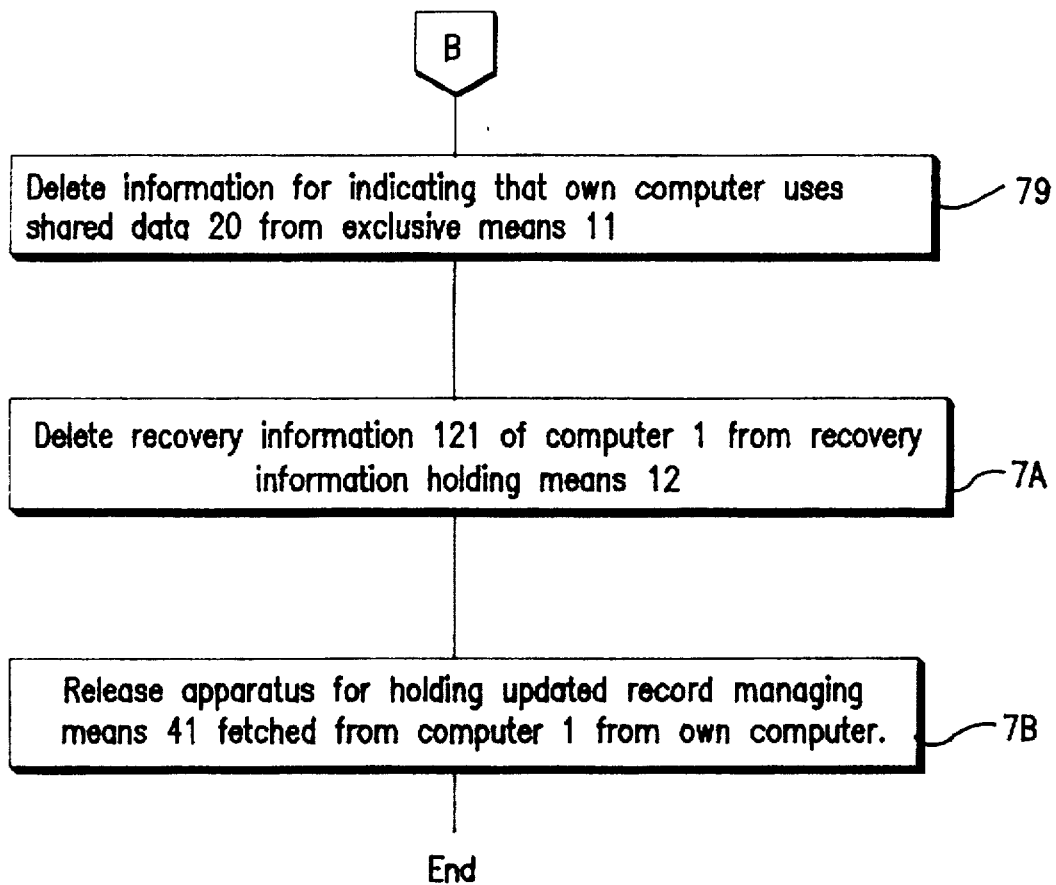

With reference to FIG. 4, the recovery processing state information 12-2 contains recovery process identification information 12-2-1 for indicating whether or not the recovery process of each computer is carried out (namely, "1 (Yes)" or "0 (No)"), and recovery process computer identification information 12-2-2 corresponding to the computer identifier of the computer for executing the recovery process.

Referring now to FIG. 1 to FIG. 7, a description will be made of operations of the failure recovery system according to the embodiment of the present invention.

The computer 1 sets the recovery information 121 of the computer 1 into the recovery information holding means 12 before commencing the work process (step 61).

As the recovery information 121, the computer identifier "1" of the computer 1 is set to the computer identifier information 12-1 in order to indicate that it is equal to the recovery information of the computer 1. Furthermore, the name of the apparatus for arranging thereon the updated record managing means 41 is set to the information about name of apparatus for arranging updated record managing means.

When the work process is commenced and a request to update the shared data 20 is issued, the computer 1 judges whether or not the information related to such a fact that other computers use this shared data 20 has been stored in the exclusive means 11 (step 62). When the computer 1 judges that other computers use the shared data 20, the computer 1 registers such a message that this computer 1 will use this shared data 20 into the exclusive means 11 (step 63). After the computer 1 outputs the shared data 20 before being updated as the updating process information to the updated record holding means 31 (step 64), this shared data 20 is updated (step 65).

Upon completion of the process operation about a certain transaction, the computer 1 attaches an identifier of "no recovery is required " (not shown) to the updating process information held in the updated record holding means 31 (step 66), and also deletes from the exclusive means 11 such information that the shared data 20 is used from the exclusive means 11 (step 67).

Similarly, the work processes are executed also in the computer 2 and the computer 3, which perform the work processes, while accessing to the shared data 20.

When a failure occurs in the computer 1, the failure notifying means 50 notifies the other computers of the failure in the computer 1.

The computer 2 and the computer 3, which have received the notification about the failure occurrence, identify the recovery information 121 stored in the recovery information holding means 12 by using the computer identifier "1" contained in the notification about the failure occurrence. Furthermore, these computers 2 and 3 judge whether or not the recovery process identification information 12-2-1 within the recovery processing state information 12-2 of this recovery information 121 indicates that the recovery process of the computer 1 has been executed by other computers (step 71).

When the computer 2 and the computer 3 judge that the recovery process of the computer 1 has not yet been carried out, these computers 2 and 3 delete such information that the computer 1 uses the shared data 20, which is stored in the exclusive means 11 (step 72), and also register such information that computers 2 and 3 themselves will use the shared data 20 (step 73). Furthermore, the computer 2 and the computer 3 set "1" for indicating "under recovery process" into the recovery process identification information 12-2-1 within the recovery processing state information 12-2 of the recovery information 121 (step 74), and also bring the computer 1 into execution state of recovery process by setting the computer identifier ("2" or "3") of the recovery executing computer into the recovery process computer identifier information 12-2-2 (step 75), so that the recovery process of the computer 1 is commenced by the recovery executing computer.

On the other hand, either when the recovery information 121 of the computer 1 where the failure occurs is not found in the recovery information holding means or when the recovery process identification information 12-2-1 within the recovery processing state information 12-2 of the recovery information 121 indicates that the recovery process of the computer 1 has been already executed by other computers, such a judgement is made that the recovery process is no longer required, so that no recovery process is performed.

Next, the computer 2 and the computer 3 acquire the name of the apparatus in which the updated record managing means 41 of the computer 1 where the failure occurs is arranged from the information about name of apparatus for arranging updated record managing means 12-3 of the recovery information 121, and then fetch the apparatus for arranging the updated record managing means 41 of this computer 1 into the recovery executing computer.

Furthermore, the computer 2 and the computer 3 obtain the name of the apparatus for arranging the updated record holding means 31 with reference to the updated record managing means 41 fetched into the apparatus (step 76).

As previously described, the updating process information of the shared data 20 by the computer 1 has been stored in this updated record holding means 31. This updating process information also contains such information about "no recovery is required" when the process of the transaction is accomplished.

The computer 2 and the computer 3 recover this shared data 20 based upon the information about "no recovery is required" among the updating process information stored in the updated record holding means 31, namely the updating process information for indicating such a fact that since the transaction is interrupted, the updating process for the shared data 20 is interrupted in a half way (step 77).

When the above-described recovery process is complete, the computer 2 and the computer 3 set the updating process information stored in the updated record holding means 31 and utilized to recover the shared data 20 into "no recovery is required" (step 78), and then delete the information that the own computers use the shared data 20 from the exclusive means 11 (step 79). Furthermore, the computer 2 and the computer 3 delete the recovery information 121 of the computer 1 from the recovery information holding means 12 (step 7A), and release the apparatus for holding the updated record managing means 41 fetched from the computer 1 from the own computers (step 7B).

After the shared data 20 updated by the computer 1 where the failure has occurred is recovered by other computers in the above-described manner, this computer 1 can be reinitiated.

In such a case that a failure occurs in the computer 1, and also another failure occurs in the computer 2 while the recovery process is carried out by this computer 2, the recovery process of the shared data 20 updated by the computer 2 is performed by the computer 3.

As previously explained, the computer 3 recovers the shared data 20 updated by the computer 2, and also searches the recovery information with request to the respective computers, such information being present within the recovery information holding means 12. When the recovery process identification information 12-2-1 is equal to "1", and also such information is present, i.e., the recovery process computer identification information 12-2-2 is equal to "2" corresponding to the computer identifier of the computer 2 where the failure has occurred, this computer 3 recognizes that the shared data 20 updated by the computer (namely, computer 1) corresponding to this recovery information (in this case, recovery information 121) should be recovered, and recovers the shared data 20 in a similar manner.

Even when the failure occurs in such a computer which performs the recovery process, the shared data updated by this computer can be recovered.

When any of these computers accomplishes the work process without an occurrence of a failure therein, this computer deletes such information for indicating that the own computer uses the shared data 20 from the exclusive means 11, and deletes the recovery information of the own computer from the recovery information holding means 12. For instance, when the computer 1 accomplishes the work process, the recovery information 121 of the computer 1 is deleted from the recovery information holding means 12.

Subsequently, even when a failure occurs in the computer 1 and the occurrence of this failure is notified to the computer 2 and the computer 3 by the failure notifying means 50, since no recovery information 121 of the computer 1 is present within the recovery information holding means 12, neither the computer 2 nor the computer 3 performs the recovery process of the computer 1.

With the above-described manner, the process operations of the failure recovery system in the loosely coupled multi-computer system, according to the embodiment of the present invention is accomplished.

The failure recovery system employed in the loosely coupled multi-computer system, according to one embodiment of the present invention, has such an advantage that even when the failure occurs in any one of the computers for constituting the loosely coupled multi-computer system, if there are other computers operable under normal condition, then such data updated by the first-mentioned computer where the failure occurs can be recovered to the data before being updated by way of any one of these computers operable under normal conditions.

Also, the failure recovery program used in the loosely coupled multi-computer system, according to another embodiment of the present invention, may execute the process operation substantially equivalent to that of the above-described failure recovery system. In addition, this failure recovery program may be stored into a storage medium such as a memory, a disk, a floppy disk, and a CD-ROM.

The failure recovery system and the failure recovery method in the loosely coupled multi-computer system, and also the medium for storing therein the failure recovery program, according to the present invention, have the feature that even when the failure occurs in any one of the computers of the loosely coupled multi-computer system, the users can continue their work without being subjected to the adverse influence caused by this failure. To realize this feature, when the process for the transaction used to update the shared data 20 is commenced, the computer 1 registers such a message that the computer 1 uses this shared data 20 into the exclusive means 11. After the updating process information corresponding to the shared data 20 before being updated has been outputted to the updated record holding means 31, the computer 1 updates this shared data 20, and deletes the updating process information of the updated record holding means 31 when the transaction is ended. Either the computer 2 or the computer 3, which is notified by the failure notifying means 50 as to such a fact that the failure happens to occur in the computer 1 before the transaction is ended, registers such a message that the own computer 2 or 3 uses this shared data 20 into the exclusive means 11. Then, the computer 2 or 3 returns the updating process information with the exception of the information about "no recovery is required", among the updating process information stored in the updated record holding means 31, thereby recovering this shared data 20. As a consequence, this updating process information is brought into such updating process information about "no recovery is required".

As previously explained, the present invention has an effect to provide such a highly reliable computer system that even when the failure occurs in any of the computers for constituting the loosely coupled multi-computer system, the user can continuously execute his work without any adverse influences caused by this failure.

Also, the present invention has another effect. That is, even when the failure occurs in any of the computers for constituting the loosing coupled multi-computer system, if there are other computers operated under normal conditions, then the data updated by the first-mentioned computer where the failure happens to occur can be recovered to the data before being updated by way of any one of these normally operated computers.

Furthermore, the present invention has another merit that the previous preparing process is no longer required. That is, in this previous preparing process, such a computer which may recover the data updated by the computer where the failure occurs to the original data thereof should receive the information required to execute this recovery process before this failure occurs.

In addition, according to the present invention, there is an advantage that since the computers need not to be connected with each other via the channels and the communication lines, the loosely coupled multi-computer system can be established at low cost.

Although the invention has been described in detail above in connection with various preferred embodiments thereof, it will be appreciated by those skilled in the art that these embodiments have been provided solely for purpose of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. A failure recovery system in a loosely coupled multi-computer system comprising:

a plurality of computers;

shared data shared between said plurality of computers;

updated record holding means for holding a copy of said shared data before being updated as updating process information; and exclusive means for registering therein an identifier of the computer for executing the updating process to said shared data; wherein only when identifiers of said other computers are not registered into said exclusive means, each of said plural computers registers the identifier of the own computer into said exclusive means, stores the state of said shared data before the updating operation as said updating process information into said updated record holding means, and thereafter updates said shared data during work execution; and each of said plural computer deletes said updating process information and deletes the identifier of the own computer from said exclusive means when the work execution is accomplished;

said failure recovery system further comprising:

failure notifying means for notifying that a failure has occurred in any of said plural computers to other computers where no failure has occurred; wherein:

when each of said plural computers receives notification for notifying that a failure happens to occur in other computers from said failure notifying means, each of said plural computers further deletes identifiers of said other computers registered into said exclusive means; registers an identifier of own computer into said exclusive means; returns said updating process information stored in said updated record holding means of said other computers to original updating process information thereof in order to recover the state of said shared data to the state thereof before the updating process; and deletes the identifier of the own computer registered into said exclusive means.

2. A failure recovery system in a loosely coupled multi-computer system comprising:

a plurality of computers;

shared data shared between said plurality of computers;

updated record holding means for holding a copy of said shared data before being updated as updating process information;

exclusive means for registering therein an identifier of the computer for executing the updating process to said shared data;

recovery information containing the identifier of said computer and such information for indicating whether or not the recovery process of said computer is carried out with respect to each of said plural computers; and failure notifying means for notifying such a fact that a failure happens to occur in any of said plural computers to other computers where no failure occurs; wherein:

only when identifiers of said other computers are not registered into said exclusive means, each of said plural computers registers the identifier of the own computer into said exclusive means, stores the state of said shared data before the updating operation as said updating process information into said updated record holding means, and thereafter updates said shared data during work execution; and each of said plural computers attaches such an identifier about "no recovery is required" to said updating process information, and deletes the identifier of the own computer from said exclusive means when the work execution is ended.

3. A failure recovery system in a loosely coupled multi-computer system as claimed in claim 2 wherein:

when each of said plural computers receives notification for notifying that a failure happens to occur in other computers from said failure notifying means, each of said computers further judges whether or not the recovery process is executed with reference to said recovery information of said other computer; and when it is judged that the recovery process is not carried out, each of said plural computers deletes the identifiers of said other computers registered in said exclusive means to thereby register the identifier of the own computer therein; registers therein such a message that the recovery process is performed to said recovery information of said other computers; returns such updating process information to which the identifier about "no recovery is required" is attached into the original updating process information thereof among said updating process information stored in said updated record holding means of said other computers so as to thereby recover the state of said shared data into the state thereof before the updating process; attaches the identifier about "no recovery is required" to said updating process information; deletes the identifier of the own computer registered in said exclusive means; and also deletes said recovery information of said other computers therefrom.

4. A failure recovery system in a loosely coupled multi-computer system comprising:

a plurality of computers;

shared data shared between said plurality of computers;

updated record holding means for holding a copy of said shared data before being updated as updating process information;

updated record managing means for holding a name of an apparatus to which said updated record holding means is set with respect to each of said plural computers;

exclusive means for registering therein an identifier of the computer for executing the updating process to said shared data;

recovery information containing the identifier of said computer, the name of the apparatus to which said updated record managing means is set and which is held by said computer, information for indicating whether or not the recovery process of said computer is executed, and also the computer identifiers of said other computers to which the recovery process is carried out; and failure notifying means for notifying such a fact that a failure happens to occur in any of said plural computers to other computers where no failure occurs; wherein:

each of said plural computers produces said recovery information for containing therein the identifier of the own computer and the name of the apparatus to which said updated record managing means of the own computer is set when work execution is commenced;

only when identifiers of said other computers are not registered into said exclusive means, each of said plural computers registers the identifier of the own computer into said exclusive means, stores the state of said shared data before the updating operation as said updating process information into said updated record holding means, and thereafter updates said shared data during work execution; and each of said plural computers attaches such an identifier about "no recovery is required" to said updating process information, and deletes the identifier of the own computer from said exclusive means when the work execution is ended.

5. A failure recovery system in a loosely coupled multi-computer system as claimed in claim 4 wherein:

when each of said plural computers receives notification for notifying that a failure happens to occur in other computers from said failure notifying means, each of said computers further judges whether or not the recovery process is executed with reference to said recovery information of said other computer; and when it is judged that the recovery process is not carried out, each of said plural computers deletes the identifiers of said other computers registered in said exclusive means to thereby register the identifier of the own computer therein; registers therein such a message that the recovery process is performed to said recovery information of said other computers and also register the identifier of the own computer;

recognizes the name of said apparatus to which said updated record holding means is set with reference to said recovery information of said other computers; returns such updating process information to which the identifier about "no recovery is required" is attached into the original updating process information thereof among said updating process information stored in said updated record holding means of said other computers so as to thereby recover the state of said shared data into the state thereof before the updating process; attaches the identifier about "no recovery is required" to said updating process information; deletes the identifier of the own computer registered in said exclusive means; and also deletes said recovery information of said other computers therefrom.

6. A failure recovery system in a loosely coupled multi-computer system as claimed in claim 5 wherein:

when each of said plural computers receives notification for notifying that a failure happens to occur in other computers from said failure notifying means, each of said computers further judges whether or not there is said recovery information where said message that said other computers execute the recovery process have been registered; and when it is judged that said recovery information is present, each of said plural computers performs a process operation to update also said shared data updated by the computer corresponding to said recovery information in a similar manner to update said shared data updated by said other computers, thereby the state of said shared data is recovered to the state thereof before the updating process.

7. A failure recovery method in a loosely coupled multi-computer system comprising: a plurality of computers; shared data shared between said plurality of computers; undated record holding means for holding a copy of said shared data before being updated as updating process information; exclusive means for registering therein an identifier of the computer for executing the updating process to said shared data; and failure notifying means for notifying such a fact that a failure occurs in any of said plural computers to other computers where no failure occurs; wherein:

said failure recovery method includes the following steps:

only when identifiers of said other computers are not registered into said exclusive means, each of said plural computers registers the identifier of the own computer into said exclusive means, stores the state of said shared data before the updating operation as said updating process information into said updated record holding means, and thereafter updates said shared data during work execution;

each of said plural computers deletes said updating process information and deleted the identifier of the own computer from said exclusive means when the work execution is accomplished;

when each of said plural computers receives notification for notifying that a failure happens to occur in other computers from said failure notifying means, each of said plural computers further deletes identifiers of said other computers registered into said exclusive means; registers an identifier of own computer into said exclusive means; returns said updating process information stored in said updated record holding means of said other computers to original updating process information thereof in order to recover the state of said shared data to the state thereof before the updating process; and deletes the identifier of the own computer registered into said exclusive means.

8. A failure recovery method in a loosely coupled multi-computer system comprising: a plurality of computers; shared data shared between said plurality of computers; updated record holding means for holding a copy of said shared data before being updated as updating process information; exclusive means for registering therein an identifier of the computer for executing the updating process to said shared data; recovery information containing the identifier of said computer and such information for indicating whether or not the recovery process of said computer is carried out with respect to each of said plural computers; and, failure notifying means for notifying such a fact that a failure happens to occur in any of said plural computers to other computers where no failure occurs; wherein:

said failure recovery method includes the steps:

only when identifiers of said other computers are not registered into said exclusive means, each of said plural computers registers the identifier of the own computer into said exclusive means, stores the state of said shared data before the updating operation as said updating process information into said updated record holding means, thereafter updates said shared data during work execution; each of said plural computers attaches such an identifier about "no recovery is required" to said updating process information, and deletes the identifier of the own computer from said exclusive means when the work execution is ended.

9. A failure recovery method in a loosely coupled multi-computer system as claimed in claim 8 wherein:

said failure recovery method includes the steps of:

when each of said plural computers receives notification for notifying that a failure happens to occur in other computers from said failure notifying means, each of said computers further judges whether or not the recovery process is executed with reference to said recovery information of said other computer; and when it is judged that the recovery process is not carried out, each of said plural computers deletes the identifiers of said other computers registered in said exclusive means to thereby register the identifier of the own computer therein; registers therein such a message that the recovery process is performed to said recovery information of said other computers; returns such updating process information to which the identifier about "no recovery is required" is attached into the original updating process information thereof among said updating process information stored in said updated record holding means of said other computers so as to thereby recover the state of said shared data into the state thereof before the updating process; attaches the identifier about "no recovery is required" to said updating process information; deletes the identifier of the own computer registered in said exclusive means; and also deletes said recovery information of said other computers therefrom.

10. A failure recovery method in a loosely coupled multi-computer system comprising: a plurality of computers; shared data shared between said plurality of computers; updated record holding means for holding a copy of said shared data before being updated as updating process information; updated record managing means for holding a name of an apparatus to which said updated record holding means is set with respect to each of said plural computers; exclusive means for registering therein an identifier of the computer for executing the updating process to said shared data; recovery information containing the identifier of said computer, the name of the apparatus to which said updated record managing means is set and which is held by said computer, information for indicating whether or not the recovery process of said computer is executed, and also the computer identifiers of said other computers to which the recovery process is carried out; and, failure notifying means for notifying such a fact that a failure happens to occur in any of said plural computers to other computers where no failure occurs; wherein:

said failure recovery method includes the following steps:

each of said plural computers produces said recovery information for containing therein the identifier of the own computer and the name of the apparatus to which said updated record managing means of the own computer is set when work execution is commenced;

only when identifiers of said other computers are not registered into said exclusive means, each of said plural computers registers the identifier of the own computer into said exclusive means, stores the state of said shared data before the updating operation as said updating process information into said updated record holding means, thereafter updates said shared data during work execution;

each of said plural computers attaches such an identifier about "no recovery is required" to said updating process information, and deletes the identifier of the own computer from said exclusive means when the work execution is ended.

11. A failure recovery method in a loosely coupled multi-computer system as claimed in claim 10 wherein:

said failure recovery method includes the following steps:

when each of said plural computers receives notification for notifying that a failure happens to occur in other computers from said failure notifying means, each of said computers further judges whether or not the recovery process is executed with reference to said recovery information of said other computer; and when it is judged that the recovery process is not carried out, each of said plural computers deletes the identifiers of said other computers registered in said exclusive means to thereby register the identifier of the own computer therein; registers therein such a message that the recovery process is performed to said recovery information of said other computers and also the identifier of the own computer;

recognizes the name of said apparatus to which said updated record holding means is set with reference to said recovery information of said other computers; returns such updating process information to which the identifier about "no recovery is required" is attached into the original updating process information thereof among said updating process information stored in said updated record holding means of said other computers so as to thereby recover the state of said shared data into the state thereof before the updating process; attaches the identifier about "no recovery is required" to said updating process information; deletes the identifier of the own computer registered in said exclusive means; and also deletes said recovery information of said other computers therefrom.

12. A failure recovery method in a loosely coupled multi-computer system as claimed in claim 11 wherein:

said failure recovery method includes the steps:

when each of said plural computers receives notification for notifying that a failure happens to occur in other computers from said failure notifying means, each of said computers further judges whether or not there is said recovery information where said message that said other computers execute the recovery process have been registered; and when it is judged that said recovery information is present, each of said plural computers performs a process operation to update also said shared data updated by the computer corresponding to said recovery information in a similar manner to update said shared data updated by said other computers, thereby the state of said shared data is recovered to the state thereof before the updating process.

13. A medium for storing therein a failure recovery program in a loosely coupled multi-computer system characterized by that:

in the loosely coupled multi-computer system comprising: a plurality of computers; shared data shared between said plurality of computers; updated record holding means for holding a copy of said shared data before being updated as updating process information; exclusive means for registering therein an identifier of the computer for executing the updating process to said shared data; and, failure notifying means for notifying such a fact that a failure happens to occur in any of said plural computers to other computers where no failure occurs;

said medium stores therein a program such that:

only when identifiers of said other computers are not registered into said exclusive means, each of said plural computers registers the identifier of the own computer into said exclusive means, stores the state of said shared data before the updating operation as said updating process information into said updated record holding means, and thereafter updates said shared data during work execution; and each of said plural computers deletes said updating process information and deletes the identifier of the own computer from said exclusive means when the work execution is accomplished.

14. A medium for storing therein a failure recovery program in a loosely coupled multi-computer system as claimed in claim 13 wherein:

when each of said plural computers receives notification for notifying that a failure happens to occur in other computers from said failure notifying means, said program stored in the medium further deletes identifiers of said other computers registered into said exclusive means; registers an identifier of own computer into said exclusive means; returns said updating process information stored in said updated record holding means of said other computers to original updating process information thereof in order to recover the state of said shared data to the state thereof before the updating process; and deletes the identifier of the own computer registered into said exclusive means.

15. A medium for storing therein a failure recovery program in a loosely coupled multi-computer system characterized by that:

in the loosely coupled multi-computer system comprising: a plurality of computers; shared data shared between said plurality of computers; updated record holding means for holding a copy of said shared data before being updated as updating process information; exclusive means for registering therein an identifier of the computer for executing the updating process to said shared data; recovery information containing the identifier of said computer and such information for indicating whether or not the recovery process of said computer is carried out with respect to each of said plural computers; and failure notifying means for notifying such a fact that a failure happens to occur in any of said plural computers to other computers where no failure occurs;

said medium stores therein a program such that:

only when identifiers of said other computers are not registered into said exclusive means, each of said plural computers registers the identifier of the own computer into said exclusive means, stores the state of said shared data before the updating operation as said updating process information into said updated record holding means, and thereafter updates said shared data during work execution; and each of said plural computers attaches such an identifier about "no recovery is required" to said updating process information, and deletes the identifier of the own computer from said exclusive means when the work execution is ended.

16. A medium for storing therein a failure recovery program in a loosely coupled multi-computer system as claimed in claim 15 wherein:

when each of said plural computers receives notification for notifying that a failure happens to occur in other computers from said failure notifying means, said program stored in the medium further judges whether or not the recovery process is executed with reference to said recovery information of said other computer; and when it is judged that the recovery process is not carried out, said program deletes the identifiers of said other computers registered in said exclusive means to thereby register the identifier of the own computer therein; registers therein such a message that the recovery process is performed to said recovery information of said other computers; returns such updating process information to which the identifier about "no recovery is required" is attached into the original updating process information thereof among said updating process information stored in said updated record holding means of said other computers so as to thereby recover the state of said shared data into the state thereof before the updating process; attaches the identifier about "no recovery is required" to said updating process information; deletes the identifier of the own computer registered in said exclusive means; and also deletes said recovery information of said other computers therefrom.

17. A medium for storing therein a failure recovery program in a loosely coupled multi-computer system characterized by that:

in the loosely coupled multi-computer system comprising: a plurality of computers; shared data shared between said plurality of computers; updated record holding means for holding a copy of said shared data before being updated as updating process information; updated record managing means for holding a name of an apparatus to which said updated record holding means is set with respect to each of said plural computers; exclusive means for registering therein an identifier of the computer for executing the updating process to said shared data; recovery information containing the identifier of said computer, the name of the apparatus to which said updated record managing means is set and held by said computer, information for indicating whether or not the recovery process of said computer is executed, and also the computer identifiers of said other computers to which the recovery process is carried out; and, failure notifying means for notifying such a fact that a failure happens to occur in any of said plural computers to other computers where no failure occurs;

said medium stores therein a program such that;

each of said plural computers produces said recovery information for containing therein the identifier of the own computer and the name of the apparatus to which said updated record managing means of the own computer is set when work execution is commenced;

only when identifiers of said other computers are not registered into said exclusive means, each of said plural computers registers the identifier of the own computer into said exclusive means, stores the state of said shared data before the updating operation as said updating process information into said updated record holding means, and thereafter updates said shared data during work execution; and each of said plural computers attaches such an identifier about "no recovery is required" to said updating process information, and deletes the identifier of the own computer from said exclusive means when the work execution is ended.

18. A medium for storing therein a failure recovery program in a loosely coupled multi-computer system as claimed in claim 17 wherein:

when each of said plural computers receives notification for notifying that a failure happens to occur in other computers from said failure notifying means, said program in the medium further judges whether or not the recovery process is executed with reference to said recovery information of said other computer; and when it is judged that the recovery process is not carried out, said program deletes the identifiers of said other computers registered in said exclusive means to thereby register the identifier of the own computer therein; registers therein such a message that the recovery process is performed to said recovery information of said other computers and also the identifier of the own computer;

recognizes the name of said apparatus to which said updated record holding means is set with reference to said recovery information of said other computers; returns such updating process information to which the identifier about "no recovery is required" is attached into the original updating process information thereof among said updating process information stored in said updated record holding means of said other computers so as to thereby recover the state of said shared data into the state thereof before the updating process; attaches the identifier about "no recovery is required" to said updating process information; deletes the identifier of the own computer registered in said exclusive means; and also deletes said recovery information of said other computers therefrom.

19. A medium for storing therein a failure recovery program in a loosely coupled multi-computer system as claimed in claim 18 wherein:

when each of said plural computers receives notification for notifying that a failure happens to occur in other computers from said failure notifying means, said program stored in the medium further judges whether or not there is said recovery information where said message that said other computers execute the recovery process have been registered; and when it is judged that said recovery information is present, said program performs a process operation to update also said shared data updated by the computer corresponding to said recovery information in a similar manner to update said shared data updated by said other computers, thereby the state of said shared data is recovered to the state thereof before the updating process.

* * * * *